Oct. 27, 1953 F. GRAY 2,657,378

PULSE TRANSLATION APPARATUS

Filed May 25, 1951 2 Sheets-Sheet 1

INVENTOR
F. GRAY
BY Harry C. Hart
ATTORNEY

Oct. 27, 1953 F. GRAY 2,657,378

PULSE TRANSLATION APPARATUS

Filed May 25, 1951 2 Sheets-Sheet 2

INVENTOR
F. GRAY
BY Harry C. Hart
ATTORNEY

Patented Oct. 27, 1953 2,657,378

UNITED STATES PATENT OFFICE 2,657,378

PULSE TRANSLATION APPARATUS

Frank Gray, East Orange, N. J., assignor to Bell Telephone Laboratories, Incorporated, New York, N. Y., a corporation of New York Application May 25, 1951, Serial No. 228,247

3 Claims. (Cl. 340—345)

This invention relates to signal transducer apparatus and has for its general object to convert a signal in the form of a space pattern into one having the form of a time pattern.

It is a feature of the invention that the space pattern input may be in the form of a magnetic record or the setup of a register which controls the distribution of magnetic fields.

It is another feature of the invention that the time pattern output may take the form of a sequence of electric pulses which occur in rapid succession and in a pattern which stands in a preassigned relation to the space pattern input.

It is still another feature that the time pattern output may be repeated as often as may be desired, either with or without the interpolation of pulse groups derived from other sources.

There are many situations in modern communication switching and computing practice in which it is required to convert so-called "parallel" signals, i. e., signals which appear in the form of different electrical conditions on the several conductors of a group, into corresponding so-called "serial" signals appearing on a single conductor or channel and identified solely by virtue of the time intervals which separate them. The time division multiplexing of a group of simultaneous telephone conversations furnishes one example, and so-called "repertory" dialing systems furnish others. Another example is found in the operation of a high speed digital computer in which there is provided an information register or "memory" unit in the form of a pulse recirculation system employing a delay line, electromagnetic or mechanical, together with appropriate amplifiers and gates. Large amounts of information can be stored in such devices over long periods, while remaining readily available for immediate use on demand. The stored information must, however, be in the form of a train of pulses which are spaced apart in time. The cost of providing a separate pulse recirculator for each bit of information to be stored would evidently be prohibitive.

Thus, there exists a need for simple and reliable apparatus for converting signals arranged in parallel on a number of conductors into high speed signals arranged in series on a single conductor. The apparatus of the invention is offered to meet this need.

The invention utilizes a cathode-beam tube of the type described in a copending application of Frank Gray, filed May 25, 1951, Serial No. 228,246. This beam tube is provided with a magnetically permeable window; and, in accordance with the present invention, means such as a space pattern record of magnetic conditions recorded on a tape or a distribution of individually controlled magnets is disposed in magnetizing relation with this window. The cathode beam impacts the interior face of the window and makes a rapid sweep lengthwise of it. Secondary electrons are ejected from each point of impact. The current of these secondary electrons is picked up by one or more auxiliary electrodes within the tube, and the magnitude of this secondary current at each instant of time depends on the condition of the magnetized tape or of the magnets, as the case may be, at each location along the window. Thus, the parallel input signal is converted into a rapid sequence of pulses occurring on a single output channel.

The invention will be fully apprehended from the following detailed description of preferred embodiments thereof, taken in connection with the appended drawings, in which.

Figure 1:
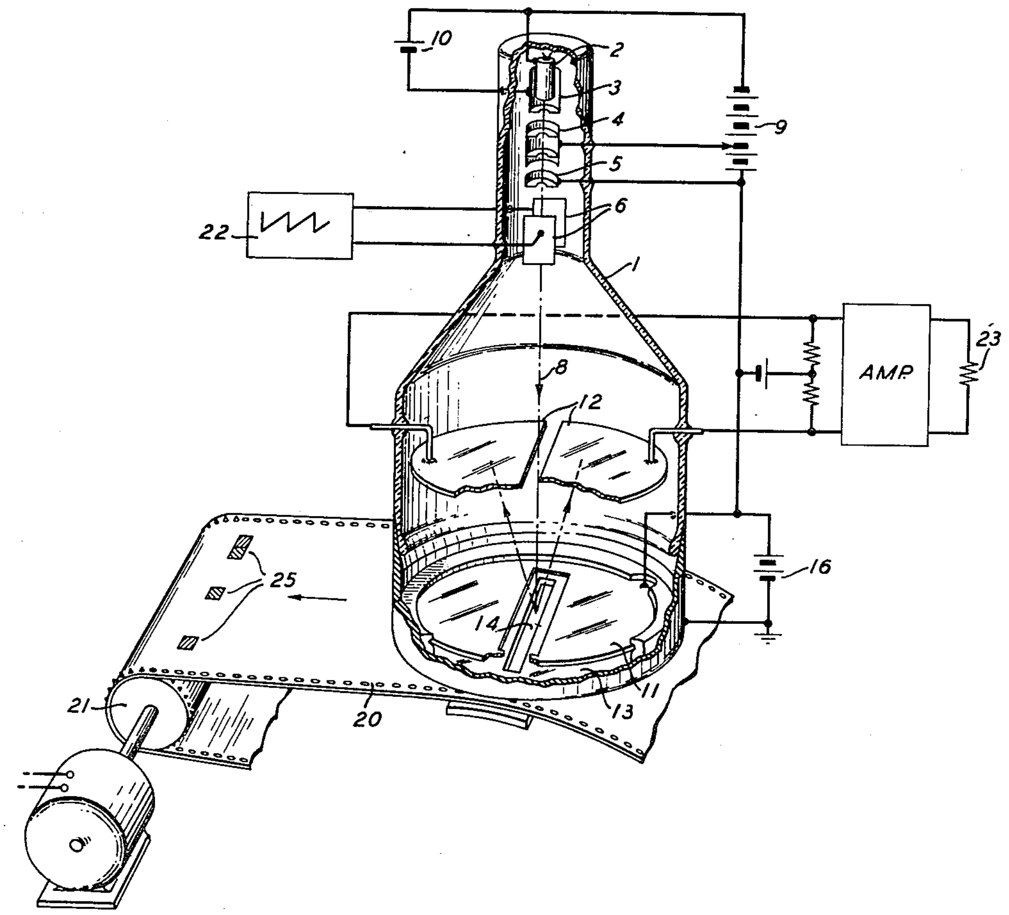
Fig. 1 is a schematic perspective diagram of apparatus for converting parallel signals recorded on a magnetic tape into serial signals on a single output channel.

Referring now to the drawings, Fig. 1 illustrates apparatus of one form for converting a parallel signal in the form of a magnetic condition space pattern record on a magnetizable tape 20 into a corresponding time sequence of electric pulses on a single output channel. The apparatus includes a cathode-beam tube comprising an evacuated envelope 1 having therein a cathode 2 for generating a cathode beam, a control electrode 3, accelerating and focusing electrodes 4, 5, elements 6 for deflecting the cathode beam 8, and operating bias sources 9, 10 for the several electrodes, all of which may be conventional. It also includes a secondary electron accelerating electrode 11 and a pair of secondary electron collecting electrodes or targets 12. The enlarged end of the tube, located opposite to the cathode, is formed of a sheet of copper 13 sealed to the glass wall, and this sheet is provided with a magnetically permeable window 14 which may comprise a narrow slot extending not quite all the way through the copper. Its length in one direction is equal to or somewhat in excess of the excursion of the cathode beam 8 in the course of its sweep or, in other words, to the width of the magnetic pattern record to be reproduced, while its width in the other direction is only as great as the width of the cathode beam itself. Such a construction permits the use of a window of an exceedingly small thickness dimension without danger of rupture under the atmospheric pressure external to the tube. The inside wall of this window is provided with a surface of secondary emissive material 15 such as a silver-magnesium alloy. A suitable potential is applied, as by a battery 16, to the auxiliary accelerating electrode 11 so as to withdraw substantially all of the secondary electrons produced by bombardment of the inside face of the window by the electrons of the cathode beam. The mean potential of the targets 12 is preferably maintained at the same value as that of the accelerating electrode 11 so that the space between these electrodes is substantially field-free.

The tape 20 bearing the record of magnetic conditions may be advanced in the direction normal to the length of the window 14 by a pulley 21 driven by a motor or otherwise.

In operation, the output voltage of a saw-tooth generator 22 is applied to the deflecting elements 6 and causes the cathode beam 8 to sweep along the length of the window 14 from one end to the other at approximately constant speed and then rapidly to jump back to its starting point to repeat the operation. From each point of the inside face of the window 14 impinged by the primary electrons of the cathode beam, secondary electrons are ejected. The localized magnetic fields of the magnetic pattern recorded on the tape 20 penetrate through the thin window 14 to its inner surface, where they modify the movements of these secondary electrons. As the beam 8 moves along the length of the window from one end to the other, the resulting variation of the current of secondary electrons is picked up by one or other of the collecting electrodes 12 and applied to a utilization circuit or load 23 where it reflects the sequence of magnetic conditions which are met by the beam 8 in its passage from one side of the tape 20 to the other at that part of its length which is in contact with the permeable window 14. The apparatus thus converts the parallel group of signals recorded on the tape into signals which are serially arranged in time in the single output circuit. Similarly, on the next sweep of the beam, the tape may or may not have advanced by an amount which locates a different parallel space pattern signal opposite to the window. If it has so advanced, the new space pattern signal is similarly converted into a new serial time sequence signal. If it has not advanced, the original time sequence signal is repeated. Thus, the secondary electron current in the utilization circuit varies in correspondence with the details of the parallel signal recorded on the tape, and the output current constitutes a serial version thereof.

In general, the mechanism by which the magnetic fields penetrate the permeable window may be of several varieties, in dependence on whether the field is normal to the window surface or tangential to it and on whether the interior face of the window be rough or smooth. These mechanisms are fully discussed in the aforementioned copending application of Frank Gray. While any of them may be employed in carrying out the present invention, the preferred one, for which the apparatus shown is well suited, involves the lateral deflection of the ejected secondary electrons, to one side or to the other, by a magnetic field whose principal component is tangential to the window surface and along its length; i. e., the tape is transversely magnetized, bearing magnetic pole regions 25 as indicated. The substantial electric field in the small space between the window 14 and the anode 11 acts to draw off substantially all of the ejected secondary electrons and project them backward in the general direction of the targets 12. They come under the influence of the magnetic field as soon as they have gathered any velocity, and if present, it acts to deflect them to one side or the other, in dependence on its polarity. They then enter the substantially field-free space between the anode 11 and the targets 12 and coast in the direction toward which they have been deflected, eventually striking one or other of the targets, to generate a current of one sign or the other in the output circuit. By virtue of the connection of these two targets 12 in push-pull to the terminals of the load 23, the effect of this construction is to generate in the load a current which is the serial signal counterpart of the parallel signal space pattern recorded on the tape.

As the primary electron beam 8 sweeps along the length of the window in the course of each scan, the point of impact of the beam on the window, which is the instantaneous point source of secondary electrons, moves along and so passes through localized magnetic fields which penetrate the window from the transversely magnetized tape outside of the window. These localized fields may be of either polarity or zero so that the secondary electron stream is deflected by the successive localized fields in one direction or in the other or not at all. The deflection of the stream with respect to the two targets thus gives a three-valued output corresponding to the distribution of magnetic fields along a transverse line of the record.

Figure 2:
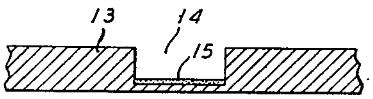
Fig. 2 is an enlarged cross-sectional view of the magnetically permeable window of the tube of Fig. 1.
Figure 3:
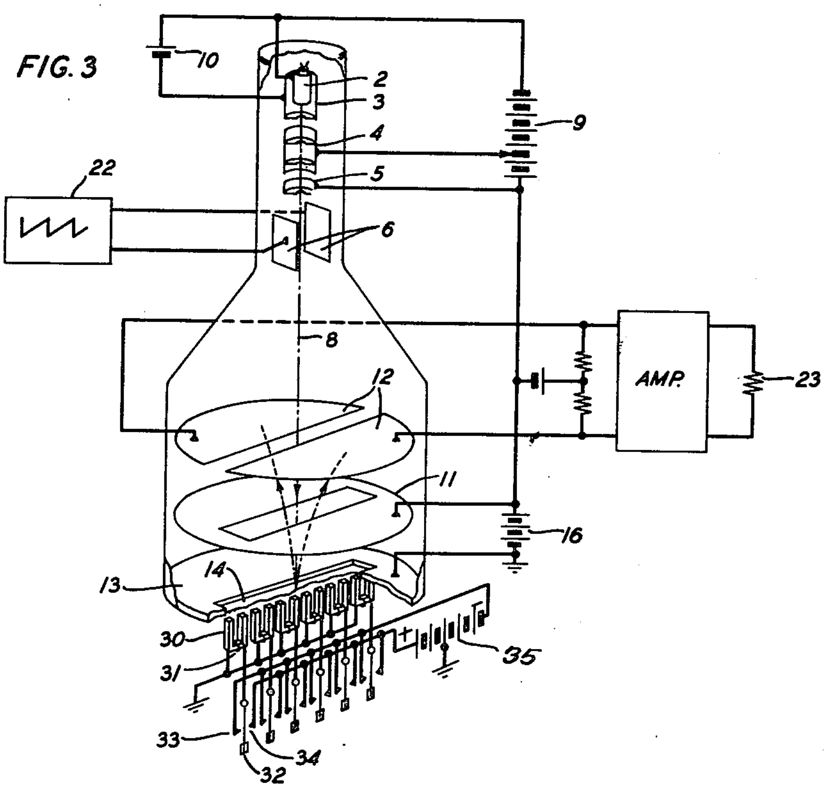
Fig. 3 is a schematic perspective diagram of apparatus for converting an input signal in the form of a permutation of individually controlled contacts into a time series of pulses on a single output channel.

Fig. 3 shows apparatus for translating directly from a space distribution of electrical or magnetic conditions, i. e., a number of simultaneous parallel signals, to a corresponding serial signal distribution in the form of a train of pulses on a single output channel without the interposition of a magnetic tape record. The apparatus may comprise a cathode-beam tube having an evacuated envelope 1, beam generating, focusing, accelerating, and deflecting electrodes 2, 3, 4, 5, 6, electrodes 11, 12 for accelerating the returning secondary electrons and for collecting these electrons, and a saw-tooth voltage generator 22 for governing the beam sweep, all of which may be the same as those of Fig. 1. As in the case of Fig. 1, the tube 1 is provided with a magnetically permeable window 14 at its enlarged end which again may be the same in construction as that shown in Figs. 1 and 2. The space between the window 14 and the electrode 11 is exaggerated in the drawing in order to show the details of the external structure. Thus, in place of the magnetizable tape record 20 of Fig. 1, there are arranged in magnetizing relation with this window a plurality of small electromagnets 30, each of which is provided with an individual magnetizing winding 31. One terminal of each of these windings is connected to one terminal of a two-way, three-terminal switch 32, the other two terminals 33, 34 of which are connected to the positive and negative terminals, respectively, of a battery 35 whose center tap is connected by way of ground to the remaining terminal of the winding 31. Closure of the left-hand contact 33 of any of these switches causes magnetizing current to flow through the corresponding winding 31 in one direction, while closure of the right-hand contact 34 causes current to flow through the same winding in the opposite direction. Thus, by closing any switch to the left or to the right or by leaving it open, three different magnetic conditions may be produced locally on the inner face of the window 14 adjacent this particular magnet. In one condition, the magnetic flux is from left to right along the inside window surface; in the second condition it is from right to left; and in the third condition it is absent. For a given location of the cathode beam 8 along the length of the window 14 in the course of its sweep, there are thus three corresponding conditions of the current in the output circuit corresponding, respectively, to a flow of a larger fraction of the secondary electrons to the left-hand target 12, to the right-hand target 12, or to both targets in equal numbers.

Figure 4:
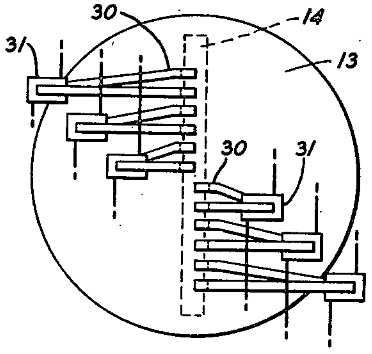
Fig. 4 is an end view of the apparatus of Fig. 3, showing in greater detail the arrangement of the individual magnets and switching contacts.
Figure 5A:
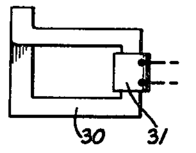
Figs. 5A and 5B are two views of a magnet for use in the apparatus of Figs. 4 and 5.
Figure 6A:
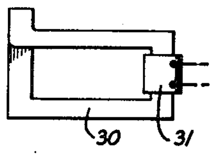
Figs. 6A and 6B are two corresponding views of another magnet for use in the apparatus of Figs. 4 and 5.
Figure 5B:
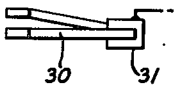
Figure 6B:
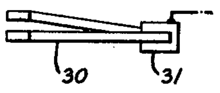

The manner in which the small electromagnets 30 may be juxtaposed with the window is shown in Fig. 4. The individual magnets may be constructed of different lengths to minimize mechanical interference between their magnetizing windings. Figs. 5A and 5B show a side view and an end view, respectively, of a smaller magnet, while Figs. 6A and 6B show corresponding views of a larger magnet. If desired, several different sizes may, of course, be employed, Fig. 4 showing three.

In operation, a space signal may be set up at leisure by an operator, the individual components being set up by operation of the contacts 33, 34 in any desired order or sequence. The cathode beam 8 is then swept along the length of the window under the influence of the saw-tooth generator 22 to eject secondary electrons from the inner face of the window 14 in the manner described above. These are then deflected to one or the other of the targets 12 to create in the output circuit 23 a pulse time sequence which is the serial counterpart of the parallel distribution of signals as registered on the contacts.

The invention has been described with particular reference to transverse magnetization of the tape 20 of Fig. 1 with its consequent distribution of transverse magnetic fluxes on the interior face of the window 14 and also with reference to a construction and disposition of the magnets 30 of Fig. 4 which gives rise to a similar flux distribution on the inside face of the window 14. It is, of course, equally applicable to a system in which the magnetization is normal to the face of the window 14 instead of transverse, the electrode structure of the tube being modified accordingly. While the output current of such a system is less sensitive to variations in the magnetic field distribution than is the system described, such reduced sensitivity may be compensated by the greater amount of resolution which may be obtained when each pair of poles of Fig. 4, or each corresponding pair of magnetized regions of the tape 20 of Fig. 1, is replaced by a single pole or region, thus permitting an improvement substantially by a factor 2 in the crowding of such poles or regions.

What is claimed is:

1. Apparatus for generating a train of pulses in a preassigned order, which comprises an evacuated envelope, means within said envelope for projecting a cathode beam, beam-receptive means sealed into a wall of said enevelope in position to be impinged by said beam, said beam-receptive means comprising a window which is permeable to magnetic flux, the inside face of said window having secondary electron emission properties, a plurality of individually controllable magnets disposed in a preassigned arrangement and in magnetizing relation with the exterior face of said window, means for individually controlling the magnetic condition of each of said magnets, means for sweeping said cathode beam along said window to eject therefrom secondary electrons in dependence on the magnetic conditions of said magnets, means for collecting said secondary electrons, an output circuit, and means for supplying the current of said secondary electrons as a pulse train to said output circuit.

2. Apparatus for generating a train of pulses in a preassigned order, which comprises an evacuated envelope, means within said envelope for projecting a cathode beam, beam-receptive means sealed into a wall of said envelope in position to be impinged by said beam, said beam-receptive means comprising a window which is permeable to magnetic flux, the inside face of said window having secondary electron emission properties, a plurality of individually controllable two-pole magnets disposed in a preassigned arrangement and in magnetizing relation with the exterior face of said window and with their poles in mutual alignment, means for individually controlling the magnetic condition of each of said magnets, means for sweeping said cathode beam along that line of said window which is nearest to said line of poles to eject from said window secondary electrons in dependence on the magnetic conditions of said magnets, means for accelerating said secondary electrons in a direction substantially normal to said window, a pair of targets, a field-free region between said accelerating means and said targets, and a utilization circuit having two terminals, each of said targets being connected to one of said terminals.

3. Apparatus for converting parallel signals into series signals which comprises an evacuated envelope, means within said envelope for projecting a cathode beam, beam-receptive means sealed into a wall of said envelope in position to be impinged by said beam, said beam-receptive means comprising a window which is permeable to magnetic flux, the inside face of said window having secondary electron emission properties, a plurality of individually controllable magnets disposed in a preassigned arrangement and in magnetizing relation with the exterior face of said window, means for individually controlling the magnetic conditions of said several magnets, said controlled conditions constituting parallel signals, means for causing said cathode beam to impinge successively on different areas of said window to eject from each of said different areas secondary electrons in dependence on the magnetic condition of that magnet which is instantaneously exterior to said area of the window, means for collecting secondary electrons ejected from said areas in serial order, a utilization circuit, and means for supplying the secondary electrons so collected to said utilization circuit.

FRANK GRAY.

References Cited in the file of this patent

UNITED STATES PATENTS

| Number | Name | Date |
|---|---|---|
| 2,534,369 | Ress | Dec. 19, 1950 |